Oct. 23, 1934.  R. VON BROCKDORFF  1,978,392
LIQUID LEVEL INDICATING MEANS
Original Filed March 16, 1931   2 Sheets-Sheet 1
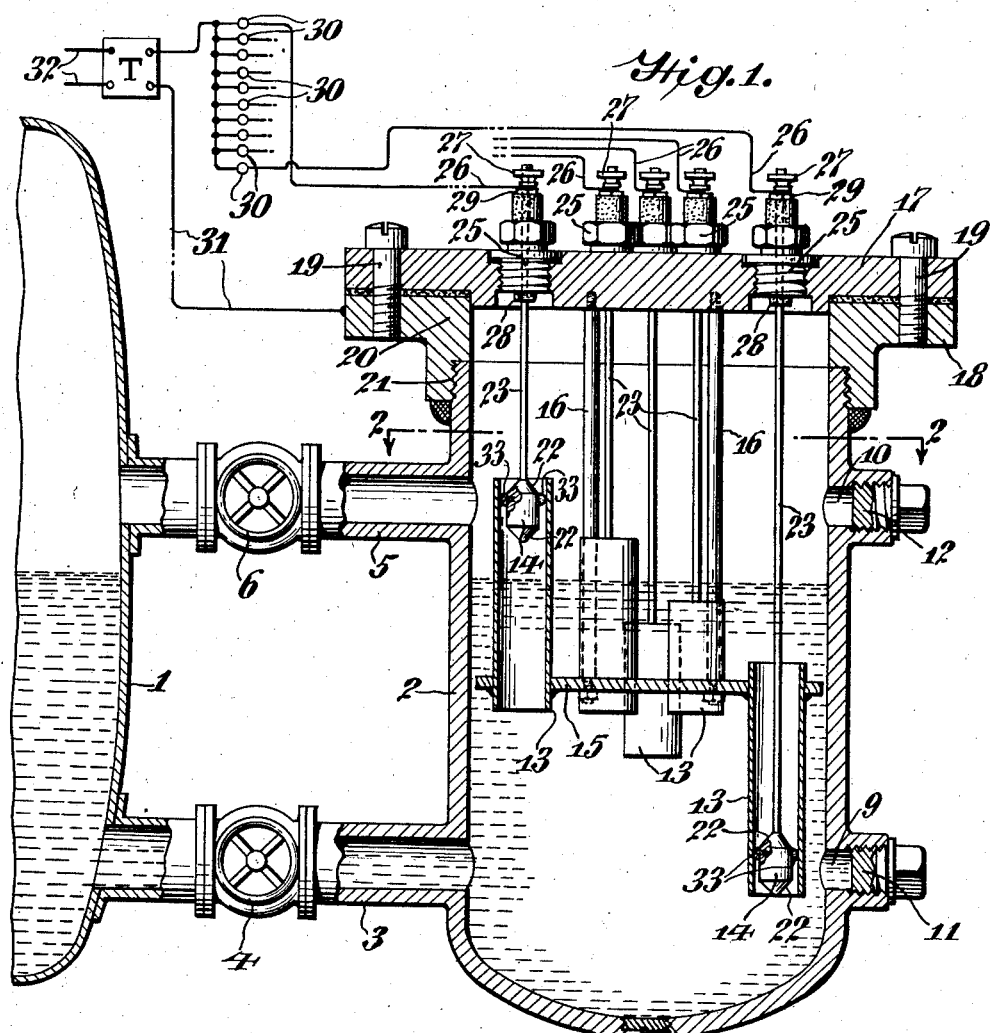
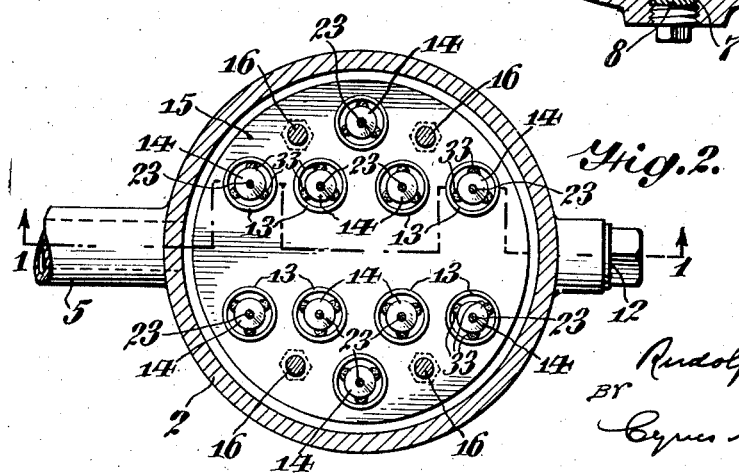
INVENTOR
Rudolf von Brockdorff
BY
Cyrus N. Anderson
Attorney

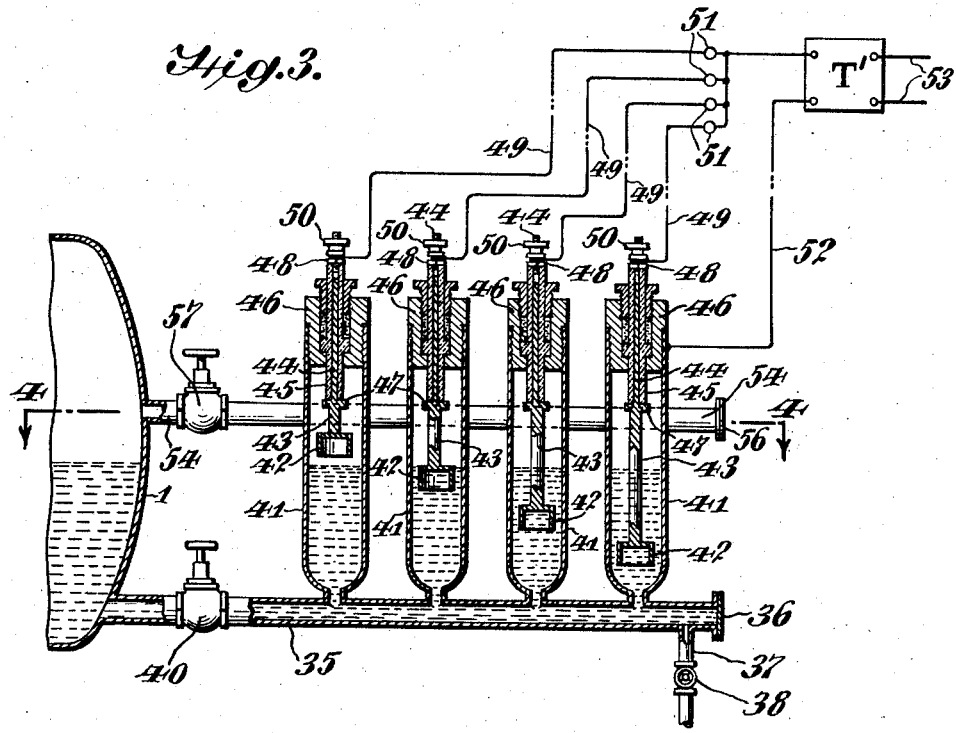
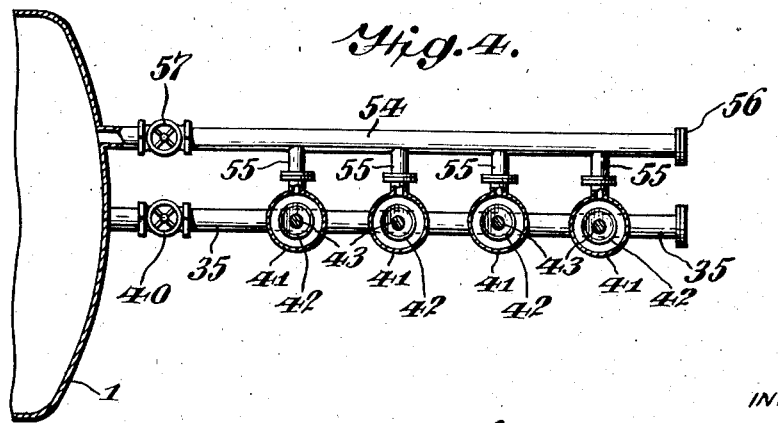

Patented Oct. 23, 1934

1,978,392

UNITED STATES PATENT OFFICE 1,978,392

LIQUID LEVEL INDICATING MEANS

Rudolf von Brockdorff, Munich, Germany

Application March 16, 1931, Serial No. 523,071.
Renewed December 7, 1933. In Germany July 10, 1930

10 Claims. (Cl. 200—152)

Applications for Letters Patent were filed in Germany on July 10 and July 15, 1930, the first application disclosing the construction as illustrated in Figs. 3 and 4 of this application, and the second application disclosing the construction as illustrated in Figs. 1 and 2 of this application.

My invention relates to means for indicating the level of a liquid, for example water, in a container. The container may be of any type as for example a steam boiler.

The general purpose of the invention is to provide means for indicating the position of the changing level of a volume of water or other liquid in a container of any kind or character.

The general object of the invention is to provide means of the character and for the purpose indicated which shall be of simple but novel construction and which also is of rugged character whereby it possesses desirable qualities of durability.

The means embodying the invention includes or comprises electric signaling means, such as lights, alarm bells or the like, located at any convenient point for observation, and it comprises pairs of electrodes the connections between which depend upon the height of the water in a container, and it is an object of the invention to provide means of a construction such that the said electrodes may be separately cleaned or repaired.

A further object of the invention is to separate the electrodes into groups spaced from each other in a vessel having communication with the container for the liquid the level of which is to be indicated, the conduits for connecting the said container to the said vessel having connection with the latter in a plane extending between the groups of electrodes.

Without attempting to set forth in greater detail at this point the further objects of the invention I shall proceed with a detailed description thereof wherein other objects will be referred to specifically or else will become apparent.

In order that the invention may be readily understood and its practical advantages fully appreciated reference should be had to the accompanying drawings wherein I have illustrated certain embodiments of the invention in forms which at present are preferred by me. However, it will be understood that the invention is susceptible of embodiment in other forms of construction and that changes in the details of construction may be made within the scope of the claims without departing from the invention or the principle thereof.

In the drawings:

Fig. 1 is a view in vertical sectional elevation of means for indicating the level of a liquid in a container, the said view being taken on the line 1—1 of Fig. 2;

Fig. 2 is a horizontal transverse sectional view taken on the line 2—2 of Fig. 1;

Fig. 3 is a view in vertical sectional elevation of means for indicating the level of a liquid in a container showing a modified construction of the invention; and Fig. 4 is a horizontal sectional view taken on the line 4—4 of Fig. 3.

In the drawings I have shown the invention as employed in connection with a steam boiler 1, a fragmentary portion only of which is shown.

Referring now to Figs. 1 and 2 I have shown at 2 a vessel having connection at a point near its lower end through a pipe or conduit 3 with the lower portion of the boiler 1. The pipe or conduit 3 is provided with a valve as indicated at 4 by means of which the passage through the said pipe may be closed if desired. When the valve 4 is open the water or other liquid flows from the boiler 1 into the vessel 2 and assumes in the latter the same level as that which it occupies in the boiler. The upper portion of the vessel 2 is connected by means of a pipe or conduit 5 with the upper portion of the boiler above the level of the liquid therein so that the steam in the boiler above the water level may be conducted into the upper portion of the vessel 2. The pipe or conduit 5 is provided with a valve 6 by means of which it may be closed if desired. The connections between the bottom and upper portions of the container 1 with corresponding portions of the vessel 2 equalize the pressure in the latter so that the water will occupy the same level in the vessel 2 that it occupies in the container.

The bottom of the vessel 2 is provided with a screw threaded opening 7 which is closed by means of a removable plug 8. The vessel also is provided with openings at 9 and 10 in alinement with the pipes or conduits 3 and 5 respectively. These openings 9 and 10 are provided for a purpose which hereinafter will be referred to and explained. The openings at 9 and 10 are closed by means of closing plugs 11 and 12.

Electrodes 13 and 14 are located within the vessel 2 at different heights therein, the said electrodes being arranged in pairs, as shown. The respective pairs of electrodes each comprises a tubular member 13 within which the other electrode 14 of the pair is located. The electrodes 13 are mounted in openings provided in a metal plate 15 which extends transversely of the vessel 2 in a plane located below the point of connection of the pipe or conduit 5 with the vessel 2. The metallic plate 15 is suspended by means of rods 16 from a top cover plate which closes the top of the vessel 2. The vessel 2 and parts associated therewith may be supported in any suitable manner as by means of a bracket, not shown, projecting from the container 1. The top cover plate 17 is secured to a flange 18 by means of fastening bolts 19, the said flange being a part of an annular member 20 which is secured to the upper end of the body portion of the vessel 2 as indicated at 21. The respective electrodes 14 may be of cylindrical construction as shown and are tapered at their upper and lower ends as indicated at 22 for the purpose of facilitating the flowing thereover or the dripping therefrom of water which may collect thereon.

The respective electrodes 14 are supported upon the lower ends of rods 23 the upper ends of which extend through and are connected with plugs 25. These plugs are similar in construction to the spark plugs which are employed in gas engines for providing the spark to effect ignition of the gas, except, of course, the sparking points are omitted. The rods 23 are insulated in known manner from the main or body portions of the plugs. The upper ends of the rods 23 project above the plugs and to the said ends the ends of electric conducting wires 26 are connected by means of binding nuts 27 in the usual or known manner. The rods 23 are each provided with a shoulder or sleeve 28 which bears against the lower end of an insulating portion of the plug structure. Nuts 29 are connected to the upper ends of the rods 23 and bear against the upper end of a projection of insulating material constituting a part of the plug structure 25.

Wire conductors 26 are provided, in the construction as illustrated, with electric lights 30 which operate, in the manner as hereinafter described, as signaling means to indicate to a person the height of the water in the container 1. Current is supplied for the lights by means of a step-down transformer T. One side of the said transformer is connected to the signal lights as indicated and to the upper ends of the rods 16, the connections through the said lights being in parallel. The other side of the transformer is indicated as having connection with the flange 18 through a conductor 31 but may be connected to any part of the vessel 2. Alternating current is supplied to the transformer T through wires 32 from a power line or power source, not shown.

For the purpose of supporting the electrodes 14 in insulated relation to the electrodes 13 of the respective pairs I have provided projections 33 of insulating material which are located between the said electrodes 13 and 14 of the respective pairs. In the construction as illustrated these projections are mounted upon the electrodes 14 but the arrangement may be reversed if preferred.

It may be noted that the electrodes 14 are located in different positions lengthwise of the vessel 2, the lowermost of the said electrodes being located at a point below which the level of the liquid in the container 1 should not descend. The remaining electrodes 14 are located in spaced relation to each other toward the top of the vessel 2, that electrode which is shown in opposed relation to the point of connection of the pipe or conduit 5 to the vessel 2 being the uppermost of the said electrodes in the arrangement as shown.

When the liquid, as for example water, rises in the vessel 2 to a level to submerge an electrode 14 so as to contact with both of the elec- trodes of a pair of electrodes the circuit including the said electrodes is closed in consequence of which the light corresponding to that particular pair of electrodes would be illuminated. Upon reference to Fig. 2 of the drawings it will be noted that the electrodes are divided into two groups on opposite sides of a vertical plane including the conduits 3 and 5. The purpose of so dividing the electrodes into groups is to permit the insertion of a rod or brush through the openings 9 and 10 and across the vessel 2 into the pipes or conduits 3 and 5 for the purpose of cleaning the latter.

It also will be noted that the plate 15 is located in a plane below the point of connection of the pipe or conduit 5 to the vessel 2. That is a desirable arrangement because it permits steam obtained from the boiler 1 to be employed for the purpose of cleaning the electrodes. When it is desired to employ the steam for that purpose the valve 4 in the pipe 3 is closed and the plug 8 is removed. The steam is then blown through the vessel 2, portions of it passing or flowing through the tubular electrodes 13, and in so doing operates to cleanse the respective pairs of electrodes. Access may be had to all of the electrodes within the vessel 2 by removing the fastening bolts 19 and lifting the top cover plate 17 together with the electrodes supported thereby; or if desired any one of the electrodes 14 may be removed separately, the diameters of the openings within which the plugs 25 are mounted being sufficiently great to permit the passage therethrough of the said electrodes 14 with the projections 33 thereon.

Referring now to Figs. 3 and 4 it will be seen that I have provided a pipe 35 having connection at one end to the container 1 at a point near the lower side of the latter and being closed at its outer end by means of a closure 36. A drain pipe 37 is connected to the pipe 35 near its outer end and through which fluid may flow, the said pipe 37 being provided with a valve 38 which normally is closed but which may be opened when desired. The pipe 35 is provided with a valve 40 which normally is open but may be closed for a purpose which will be mentioned hereinafter.

Tubular containers 41, mounted at intervals upon the pipe 35, project upwardly therefrom as shown. Each of these tubular containers 41 constitutes one of the electrodes of several pairs of electrodes, the other electrodes of the said pairs being shown at 42 within the containers 41. The electrodes 42 are located at different heights above the pipe 35 or above the lower ends of the respective containers 41. In the construction as illustrated each of the electrodes 42 is of inverted cup shape and each of them is supported upon the lower end of a metal rod 43 the upper portion of which is reduced as indicated at 44 and extends through a tubular sleeve 45 of insulating material which extends through and is mounted upon a plug 46 which projects into and has screw threaded connection with the upper end of the container 41.

For the purpose of retaining the rod 43 of each electrode 42 in place the said rod is provided with a shoulder 47 which bears against the lower end of the sleeve 45. The upper end of the rod is screw threaded and receives a binding nut 48 which bears against the upper end of the tubular sleeve 45. Conducting wires 49 are connected to the upper ends of the rods 43 by means of binding nuts 50 and each of the said conducting wires 49 includes a light 51 or other signaling device. Current for operating the signals 51 is supplied by means of a step-down transformer T' one side of the low tension side of which is connected to the said signals while the other is connected through a conductor 52 to the electrodes 41. In the construction as illustrated the wire 52 is connected to one of the electrodes 41 and through the pipe 35 to the remainder of the said electrodes 41. However, it will be understood that the wire 52 may be connected to the pipe 35 or to any other conductor having connection with all of the electrodes 41. Power is supplied to the transformer T' through conducting wires 53 having connection with a main line or power source, not shown.

For the purpose of equalizing the pressure within the tubular electrodes 41 the upper portion of the boiler above the top level of the liquid therein is connected through a pipe 54 and branch pipes 55 to the upper portions of the said electrodes 41. The pipe 54 is closed at its outer end by means of a closure 56 and is provided with a valve 57 between its point of connection with the boiler 1 and the electrodes 41, which normally is open.

The electrodes 42 are spaced from the inner sides of the tubular electrodes 41 and until the space between the electrodes of the respective pairs are closed the circuits through the signals 51, such as lights, are open and no current can flow therethrough for the purpose of operating the said signals. However, water from the boiler 1 passing through the pipe 35 passes from the said pipe into the electrodes 41. When the water rises in the said tubular electrodes to a point to close the spaces or gaps between the same and the inverted cup-shaped electrodes 42, the circuit is closed. It may be observed that the spaces between the electrodes of the three right-hand pairs of electrodes shown in Fig. 3 are closed, in consequence of which the circuits including the three lower signals 51 are closed thereby rendering the said signals operative. The gap between the electrodes of the pair at the left hand side of Fig. 1 is open, as shown, in consequence of which no current flows through the line including the uppermost of the signals 51. To anyone who may observe the indicator as it is illustrated in Fig. 3 it will be apparent that the water level in the boiler 1 is of a height to close the gaps between the electrodes of the three right-hand pairs of electrodes shown in Fig. 3, but that the said level is in a plane below the lower end or edge of the electrode 42 at the left hand side of Fig. 3.

One of the advantages of a construction like that illustrated in Figs. 3 and 4 embodying my invention is that the electrodes 42 may be separately removed from the tubular electrodes 41 to effect cleaning thereof. Upon the removal of an electrode 42 the plug 46 is removed from the upper end of the tubular electrode 41. When this has been done it will be apparent that the interior of the tubular electrode may be cleaned.

The construction and arrangement are such also that steam may be discharged from the upper portion of the boiler 1 through the electrodes 41 to effect cleaning of the interior thereof and of the electrodes 42 located therein. When it is desired to accomplish this result the valve 40 is closed and the valve 38 opened. The valve 57 being normally open the steam will escape from the upper portion of the boiler 1 and enter through the branch pipes 55 the respective electrodes 41 and will force the water therefrom out through the pipe 37. The passage of the steam through the tubular electrodes 41 in contact with the interiors thereof and in contact with the electrodes 42 will effect a cleansing thereof.

Having thus described my invention, what I claim and desire to secure by Letters Patent is:

1. In means for indicating the level of water in a boiler or the like, the combination of a container having connection with the boiler whereby water flows from the latter into the said container, a plurality of pairs of electrodes mounted in said container, one electrode of each pair being tubular and the other electrode of each pair being located in the said tubular electrode, the second named electrodes being located at different heights within the said container, the gaps between the electrodes of the respective pairs adapted to be closed by liquid in the said container, and means for passing steam through said tubular electrodes at high velocity.

2. In means for indicating the level of water in a boiler or the like, the combination of a plurality of pairs of electrodes, one electrode of each pair being tubular and the other electrode of each pair being located in the said tubular electrode, the second named electrode of each pair being located at different distances from a horizontal plane located below the lowermost of said electrodes, means for supplying water from the boiler to the said tubular electrodes, and means for passing steam through said tubular electrodes at high velocity.

3. In means for indicating the position of the level of water in a boiler or the like, the combination of a plurality of pairs of electrodes, one electrode of each pair being tubular and the other electrode of each pair being located within said tubular electrode, means for supporting the second named electrodes within the said tubular electrodes, means having connection with the said boiler for supplying water to the lower ends of the said tubular electrodes, means connecting the upper portion of said boiler to the said tubular electrodes to equalize the pressure therein to thereby permit the water to assume the same level in the said tubular electrodes as it occupies in the boiler, means for removing any one of the said second named electrodes from the tubular electrode with which it is associated, and means for passing steam through said tubular electrodes at high velocity.

4. In means for indicating the position of the level of water in a boiler or the like, the combination of a container to which water is supplied from the said boiler, the said water assuming the same level in the said container that it occupies in the boiler, a plurality of pairs of electrodes supported within the said container, means for simultaneously removing all of the said electrodes from the said container, and means for passing steam through said container and concentrating said flow of steam in the spaces between the electrodes of each pair.

5. In means for indicating the position of the level of water in a boiler or the like, the combination of a container having connection with the said boiler whereby the level of water in the said container occupies the same position as that which it occupies in the boiler, a plurality of pairs of electrodes supported in the said container one electrode of each pair being tubular and the other electrode of each pair being located in the said tubular electrode, and the said second named electrodes being located at different distances from the bottom of the said container, a cover for the said container, means for suspending the second named electrodes of the respective pairs from said cover, means for insulating the said second named electrodes from the said cover, means for removing the said second named electrodes independently of each other and means for passing steam through said container and concentrating said flow of steam in the spaces between the electrodes of each pair.

6. In means for indicating the position of the level of water in a boiler or the like, the combination of a container, a pipe having connection at one end with the lower part of said boiler and at its opposite end to the lower part of the said container, a pipe having connection at one end to the upper portion of said boiler and at its opposite end to the upper portion of the said container, a plurality of pairs of electrodes located in the said container, one electrode of each pair being tubular and the other electrode of each pair being located within and being insulated from the tubular electrode, a plate for supporting the said tubular electrodes said plate being located in a plane extending transversely of the said container and being located below the point of connection of the said second named pipe with the said container, means for removing water from the said container, and means for simultaneously causing steam to pass through the said container and through the said tubular electrodes.

7. In means for indicating the position of the level of the water in a boiler or the like, the combination of a container, a pipe being in communication at one end with the lower portion of the said boiler and at its opposite end with the lower portion of the said container, said pipe having a valve therein, a pipe having communication at one end with the upper portion of said boiler and at its opposite end with the upper portion of said container, said last named pipe having a valve therein, a top removably connected to the upper end of said container for closing the same, a plurality of electrodes located in said container one electrode of each pair being tubular and the other electrode of each pair being located within the said tubular electrode, a plate located in the said container for supporting the said tubular electrodes, rods having connection at their upper ends to the said top and at their lower ends to the said plate for supporting the latter, the said plate occupying a horizontal plane located below the point of connection of the second named pipe to the said container, means for separately removing the second named electrodes of the said pair of electrodes from the said container, and means for passing steam through said tubular electrodes at high velocity.

8. In means for indicating the position of the level of liquid in a container, the combination of a plurality of pairs of electrodes supported within said container, one of the electrodes of each pair being tubular and the other electrode of each pair being located in the said tubular electrode and spaced therefrom, the gap between the electrodes of the respective pairs adapted to be closed by a liquid in the said container, and means for passing steam through said tubular electrodes at high velocity.

9. In means for indicating the level of water in a boiler or the like, the construction of a plurality of separate pairs of electrodes, one electrode of each pair being tubular and open at its end portions for connection to the steam and water spaces of the boiler, the other electrode of each pair being solid and located in the tubular electrode of the pair, and there being annular space for water or steam between the electrodes of each pair, said annular space being the only passage for water or steam adjacent said electrodes.

10. In means for indicating the level of water in a boiler or the like, the combination of a plurality of separate pairs of electrodes, one electrode of each pair being tubular and open at its end portions for connection to the steam and water spaces of the boiler, the other electrode of each pair being solid and provided with a supporting rod and being located in the tubular electrode of the pair, and there being annular space between the electrodes of each pair and also between the rod and tubular electrode of each pair, the area of the latter space exceeding the area of the former space, the annular space between said electrodes being the only passage for water or steam adjacent said electrodes.

RUDOLF von BROCKDORFF.